United States Patent
Mansour et al.

(10) Patent No.: US 12,212,411 B2
(45) Date of Patent: Jan. 28, 2025

(54) SYSTEM AND METHOD FOR DYNAMICALLY SWITCHING FRAME CONFIGURATION FORMAT

(71) Applicant: T-Mobile Innovations LLC, Overland Park, KS (US)

(72) Inventors: Nagi A. Mansour, Arlington, VA (US); Sandeep Mangrulkar, Chantilly, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 393 days.

(21) Appl. No.: 17/689,221

(22) Filed: Mar. 8, 2022

(65) Prior Publication Data
US 2023/0291495 A1    Sep. 14, 2023

(51) Int. Cl.
| | |
|---|---|
| *H04L 1/00* | (2006.01) |
| *H04L 5/14* | (2006.01) |
| *H04W 24/04* | (2009.01) |
| *H04W 24/08* | (2009.01) |
| *H04W 28/06* | (2009.01) |

(52) U.S. Cl.
CPC ........... *H04L 1/0006* (2013.01); *H04W 24/04* (2013.01); *H04W 24/08* (2013.01); *H04W 28/06* (2013.01); *H04L 5/14* (2013.01)

(58) Field of Classification Search
CPC .... H04L 1/0006; H04W 24/04; H04W 24/08; H04W 28/06
See application file for complete search history.

(56) References Cited

U.S. PATENT DOCUMENTS

| | | | |
|---|---|---|---|
| 9,385,856 B2 | 7/2016 | Ji et al. | |
| 9,386,608 B2 | 7/2016 | He et al. | |
| 9,398,609 B2 | 7/2016 | Guo et al. | |
| 9,438,334 B2 | 9/2016 | Ji et al. | |
| 10,973,022 B1* | 4/2021 | Sung | H04B 17/345 |
| 11,057,882 B1* | 7/2021 | Marupaduga | H04W 4/90 |
| 2012/0113875 A1* | 5/2012 | Alanara | H04W 72/543 |
| | | | 370/280 |
| 2014/0233439 A1 | 8/2014 | Hong et al. | |
| 2015/0264683 A1* | 9/2015 | Kim | H04L 5/0007 |
| | | | 370/329 |
| 2016/0066304 A1 | 3/2016 | Ji et al. | |

* cited by examiner

*Primary Examiner* — Won Tae C Kim
(74) *Attorney, Agent, or Firm* — Jones Robb, PLLC

(57) ABSTRACT

Systems, methods, and processing nodes for managing a wireless communication session perform and/or comprise: setting a signal loss threshold; comparing a signal characteristic with the signal loss threshold, wherein the signal characteristic corresponds to a duplex communication between a wireless communication device and an access node in a first frame configuration format; and in response to a determination that the signal characteristic exceeds the signal loss threshold, causing the wireless communication device and the access node to switch from the first frame configuration format to a second frame configuration format.

14 Claims, 6 Drawing Sheets

SYSTEM AND METHOD FOR DYNAMICALLY SWITCHING FRAME CONFIGURATION FORMAT

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Data to and from wireless devices may be transmitted using a series of data frames, each of which has a duration of 10 milliseconds (ms). A frame constitutes ten subframes, each having a duration of 1 ms. In NR communication, each subframe is further divided into one or more slots, wherein the number of slots is $2^\mu$, where $\mu$ is an integer index corresponding to the "numerology" (i.e., a set of carrier waveform parameters, including subcarrier spacing, cyclic prefix duration, slot duration, etc.) of the communication. Each slot is further divided into fourteen (or in some cases twelve) data symbols.

Communications between the UE and the access node are duplex (bidirectional), including UE-to-access-node (uplink) communications and access-node-to-UE (downlink) communications. "Full duplex" refers to communication schemes in which uplink communications and downlink communications may occur simultaneously. Full duplex communication may be effectively simulated using a time-division duplexing (TDD) arrangement, in which uplink and downlink transmissions are sent in different time periods over the same frequency band (e.g., in different slots, subframes, frames, etc.). In each time period, a short burst of data is transmitted in the corresponding direction. To prevent collision (i.e., uplink and downlink transmissions being attempted at the same time), a network may schedule directional transmissions within a frame according to a frame configuration format. For example, the network may ensure that uplink transmissions are scheduled only in certain subframes of a frame and downlink transmissions only in certain other subframes of the frame.

OVERVIEW

Various aspects of the present disclosure relate to systems and methods of managing traffic (e.g., by managing and/or switching among frame configuration formats) in a telecommunications network.

In one exemplary aspect of the present disclosure, a method of managing traffic in a telecommunications network comprises: setting a signal loss threshold; comparing a signal characteristic with the signal loss threshold, wherein the signal characteristic corresponds to a duplex communication between a wireless communication device and an access node in a first frame configuration format; and in response to a determination that the signal characteristic exceeds the signal loss threshold, causing the wireless communication device and the access node to switch from the first frame configuration format to a second frame configuration format.

In another exemplary aspect of the present disclosure, a processing node for managing traffic in a telecommunications network comprises: an access node; and a wireless communication device configured to perform duplex communication with the access node in a plurality of frame configuration formats including a first frame configuration format and a second frame configuration format, wherein the access node is configured to: set a signal loss threshold, compare a signal characteristic with the signal loss threshold, wherein the signal characteristic corresponds to the first frame configuration format, and in response to a determination that the signal characteristic exceeds the signal loss threshold, instruct the wireless communication device to switch from the first frame configuration format to a second frame configuration format.

In another exemplary aspect of the present disclosure, a processing node for managing traffic in a telecommunications network comprises: a memory; and a processor configured to perform operations comprising: setting a signal loss threshold, comparing a signal characteristic with the signal loss threshold, wherein the signal characteristic corresponds to a duplex communication between a wireless communication device and an access node in a first frame configuration format, and in response to a determination that the signal characteristic exceeds the signal loss threshold, causing the wireless communication device and the access node to switch from the first frame configuration format to a second frame configuration format.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
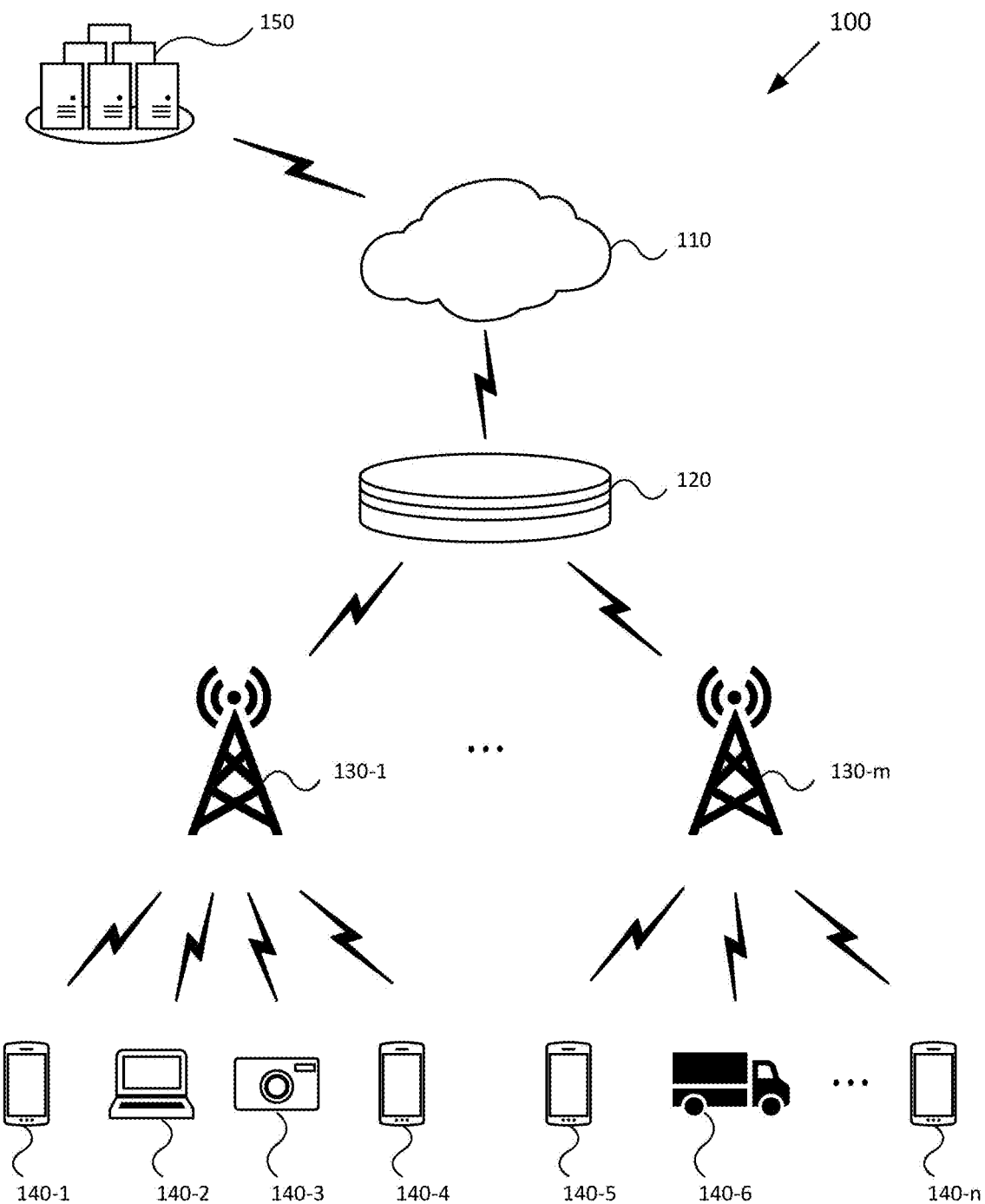
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

The use of frame configuration formats may assist an access node in preventing or reducing collision in TDD communications between a wireless device and the access node. However, by assigning a wireless device to communicate using a certain frame configuration format, the TDD communications between the wireless device and the access node may lose robustness to changes in communication conditions, such as future changes in latency, interference, path loss, and the like. For example, consider a wireless device that is assigned to communicate using a certain number of uplink subframes per frame and a certain number of downlink subframes per frame based on communication conditions at the time of assignment. If the communication conditions later change with respect to one direction of communication (e.g., if uplink communications become degraded), the wireless device may be confined to communicate using a frame configuration format that is not well-suited to current communication conditions. Thus, there exists a need for systems, devices, and methods which may switch wireless devices from one frame configuration format to another.

The present disclosure provides for systems, devices, and methods for dynamically switching frame configuration format. In accordance with various aspects of the present disclosure, changes in frame configuration format may result in TDD communications which have a relative allocation of uplink and downlink subframes that is better suited to current communication conditions.

For purposes of illustration and explanation, various portions of this detailed description refer to implementations in a network using a 5G RAT; however, the present disclosure is not so limited. The systems and methods described herein may be implemented in any RAT or combinations of RATs in which TDD communications may be implemented, including but not limited to 3G RATs such as GSM, UMTS, CDMA, etc.; 4G RATs such as WiMAX, LTE, etc.; 5G RATs such as NR; and further extensions or updated implementations of the same.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. The term "wireless device" is used interchangeably with the term "wireless communication device" herein.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with a 5G NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1, 140-2, 140-3, 140-4, 140-5, 140-6 to 140-*n* (collectively referred to as wireless devices 140). Other computing systems and devices may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices and/or the wireless devices 140. The core network 120, which may be a 5G Core Network (5GCN), connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
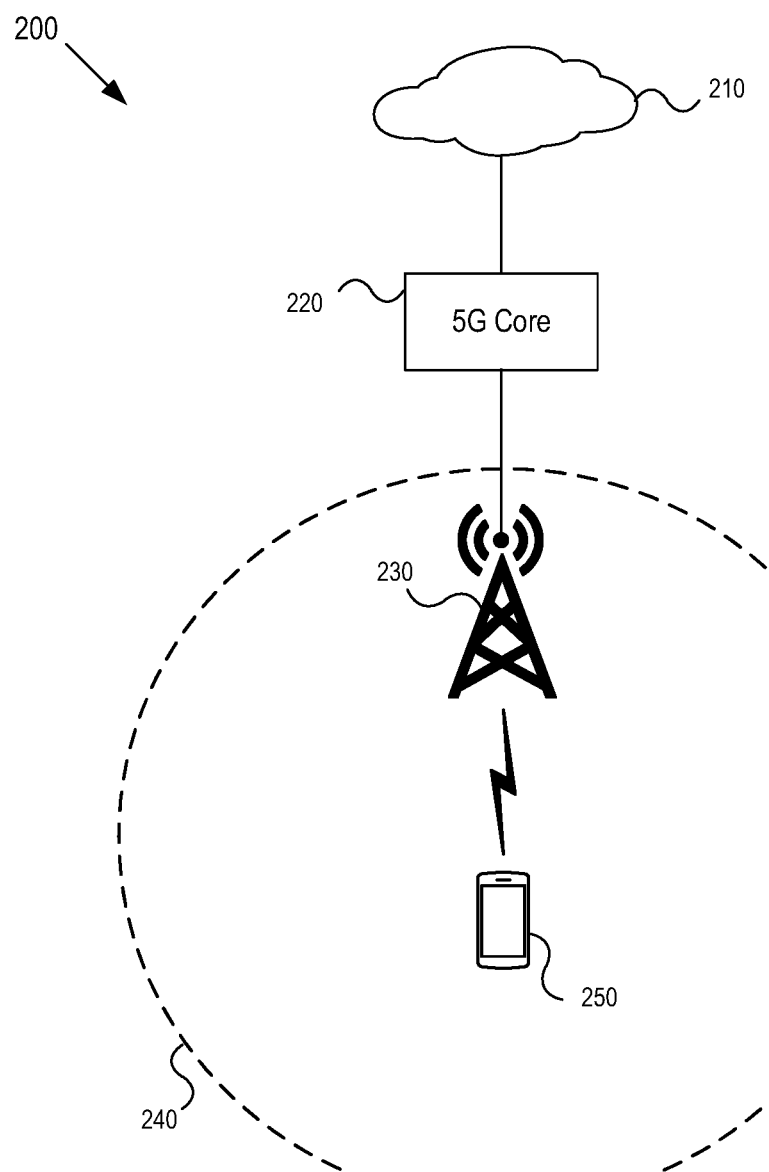
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a wireless device 250. For purposes of illustration and ease of explanation, only one access node and one wireless device are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

A scheduling entity may be located within the access node 230 and/or the 5G core 220, and may be configured to accept and deny connection requests and manage communication sessions (e.g., TDD sessions), as will be described in more detail below. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
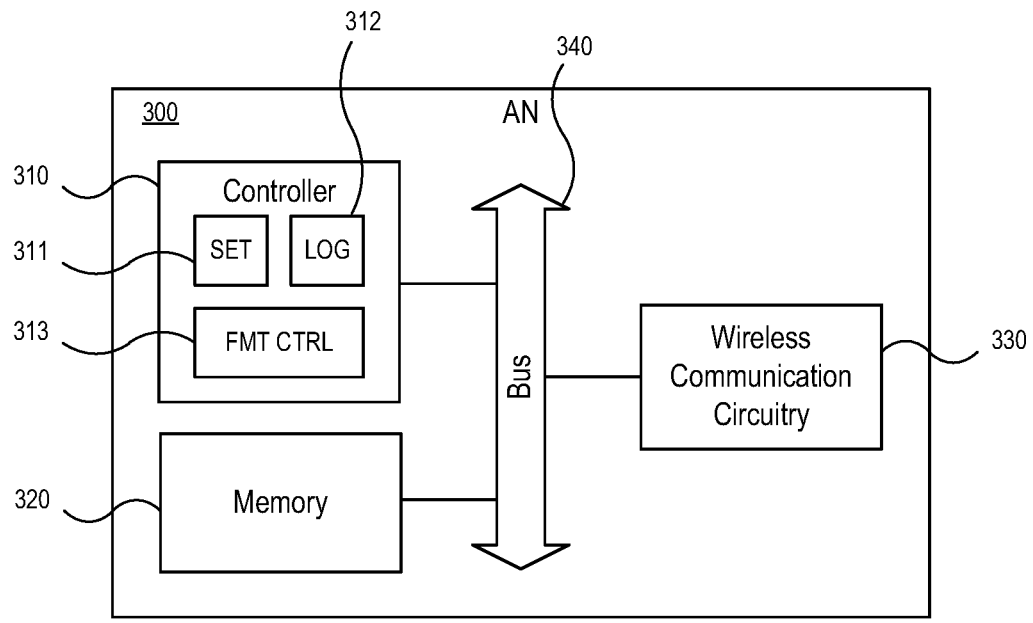
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. As illustrated the access node 300 includes a controller 310, a memory 320, wireless communication circuitry 330, and a bus 340 through which the various elements of the access node 300 communicate with one another. The controller 310 may include sub-modules or units, each of which may be implemented via dedicated hardware (e.g., circuitry), software modules which are loaded from the memory 320 and processed by the controller 310, firmware, and the like, or combinations thereof. These include a setting module 311, a logic module 312, and a format control module 313. Some or all of the sub-modules or units may physically reside within the controller 310, or may instead reside within the memory 320 and/or may be provided as separate units within the access node 300. While FIG. 3 illustrates the setting module 311, the logic module 312, and the format control module 313 as being separate modules, in practical implementations some of the modules may be combined with one another and/or may share components.

Through the use of the setting module 311, the logic module 312, and the format control module 313, the access node 300 (e.g., the controller 310) may be configured to perform various operations to implement methods in accordance with the present disclosure. For example, the setting module 311 may be configured to set a signal loss threshold; the logic module 312 may be configured to compare a signal characteristic with the signal loss threshold, wherein the signal characteristic corresponds to a communication between a wireless device and the access node 300 in a first frame configuration format; and the format control module 313 may be configured to, in response a determination that the signal characteristic exceeds the signal loss threshold, cause the wireless device and the access node 300 to switch from the first frame configuration format to a second frame configuration format. Further details of the various frame configuration formats will be described in more detail below with regard to FIG. 5.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive TDD communications from the wireless device via the wireless communication circuitry 330 and output TDD communications and/or control signals or instructions to the wireless device via the wireless communication circuitry 330, thereby managing traffic via dynamic management of frame configuration formats. The access node 300 may include additional wireless communication circuitry elements, for example to communicate using additional frequencies and/or to provide connectivity for different RATs. The access node 300 may further include additional wired communication circuitry elements.

Figure 4:
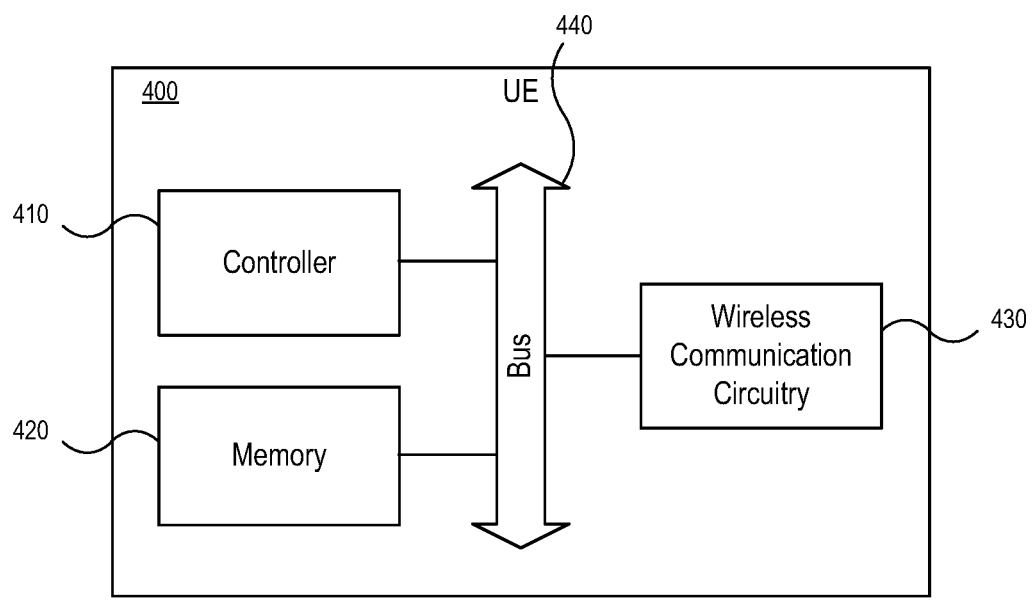
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or the wireless device 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. For example, the controller 410 may include modules that (e.g., in response to commands or instructions from an access node) may cause the wireless device 400 to switch among various frame configuration formats. Alternatively, the controller 410 may load a module from the memory 420 (e.g., a software module) to switch among various frame configuration formats.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit TDD communications to the access node via the wireless communication circuitry 430 and receive TDD communications and/or control signals or instructions from the access node via the wireless communication circuitry 430. The wireless device 400 may include additional wireless communication circuitry elements, for example to communicate using different RATs.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless device 250. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 5:
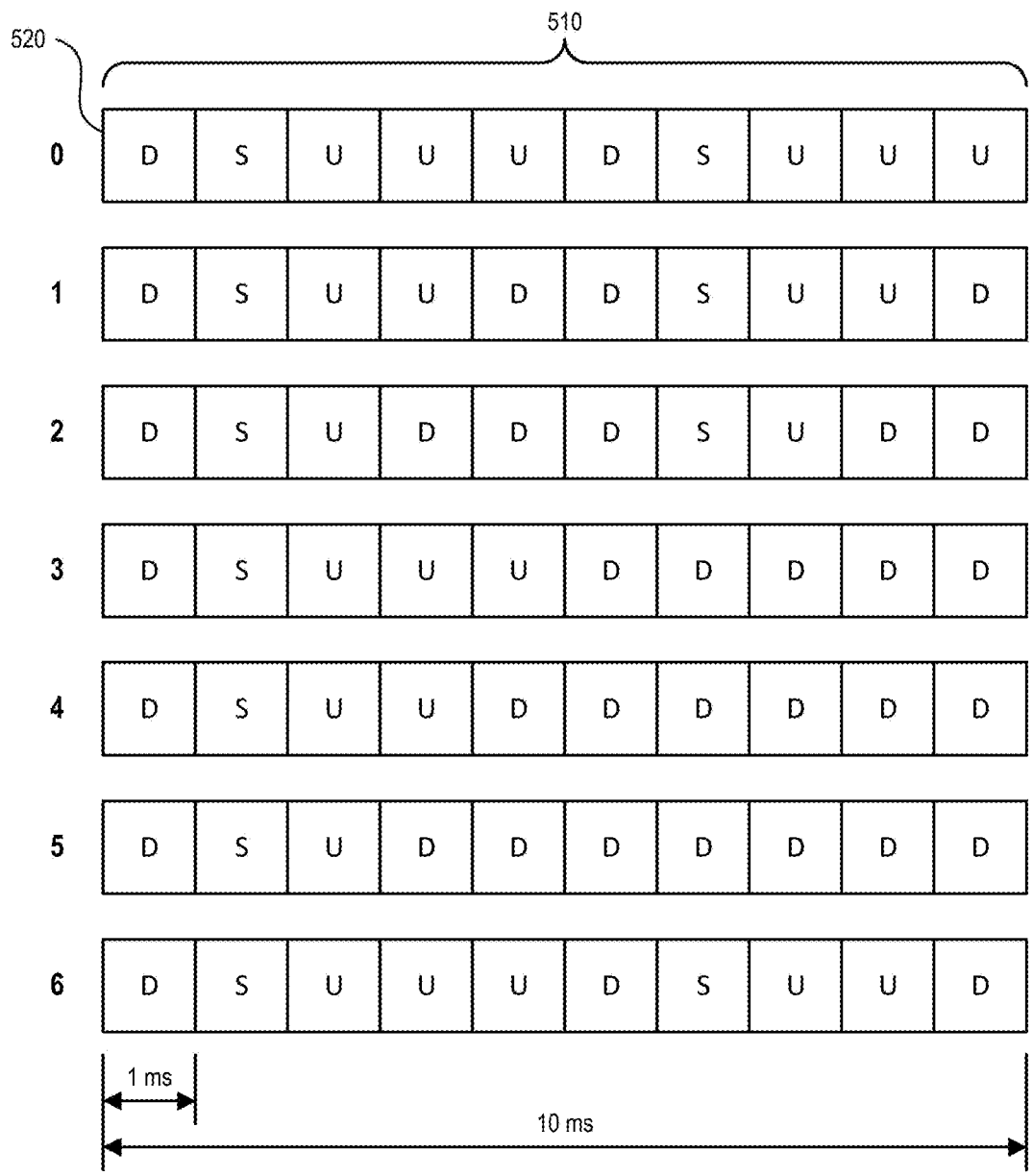
FIG. 5 illustrates exemplary frame configuration formats in accordance with various aspects of the present disclosure.

To implement traffic management in accordance with the present disclosure, FIG. 5 illustrates exemplary frame configuration formats for TDD communications between an access node (e.g., the access nodes 130, 230, and/or 300 of FIGS. 1-3) and a wireless device (e.g., the wireless devices 140, 250, and/or 400 of FIGS. 1-2 and 4). The structure and ordering of the frame configuration formats illustrated in FIG. 5 are merely exemplary, and the present disclosure is not limited to the exact frame configuration formats illustrated in FIG. 5, so long as each frame includes at least one subframe allocated to uplink communications and at least one subframe allocated to downlink communications. Moreover, it is possible for an access node to utilize different frame configuration formats simultaneously with different wireless devices; for example, some wireless devices may communicate with the access node using one frame configuration format while at the same time other wireless devices communicate with the access node using a different frame configuration format.

In FIG. 5, each frame configuration format from FC 0 to FC 6 is applied to a frame 510 of TDD communication between the access node and the wireless device, and describes a schedule of uplink and downlink for the ten subframes 520 of the frame 510. As shown in FIG. 5, a length of the frame 510 is 10 ms and a length of each subframe 520 is 1 ms. Each subframe 520 is divided into a number of slots not shown), each of which is divided into a number of data symbols (not shown). If a given subframe 520 is a downlink subframe ("D"), all slots and data symbols within the subframe 520 are scheduled for downlink communication. If a given subframe 520 is an uplink subframe ("U"), all slots and data symbols within the subframe 520 are scheduled for uplink communication. If a given subframe 520 is a special subframe ("S"), the slots and data symbols within the subframe are scheduled for downlink control information and reference signals, followed by a guard period, followed by uplink control information and reference signals. Thus, an S subframe is a transition subframe from downlink to uplink.

The first three subframes 520 follow the pattern D-S-U for each frame configuration format illustrated in FIG. 5. However, each frame configuration formats exhibits a different relative allocation of D, S, and U subframes. For example, in FC 0 the subframes 520 follow the pattern D-S-U-U-U-D-S-U-U-U, and thus the frame 510 includes two downlink subframes, six uplink subframes, and two special subframes; in FC 1 the subframes 520 follow the pattern D-S-U-U-D-D-S-U-U-D, and thus the frame 510 includes four downlink subframes, four uplink subframes, and four special subframes; in FC 2 the subframes 520 follow the pattern D-S-U-D-D-D-S-U-D-D, and thus the frame 510 includes six downlink subframes, two uplink subframes, and two special subframes; and so on. Each of the frame configuration formats shown in FIG. 5 may correspond to the same signal characteristics, including numerology, subframe spacing, subframe duration, and so on.

Figure 6:
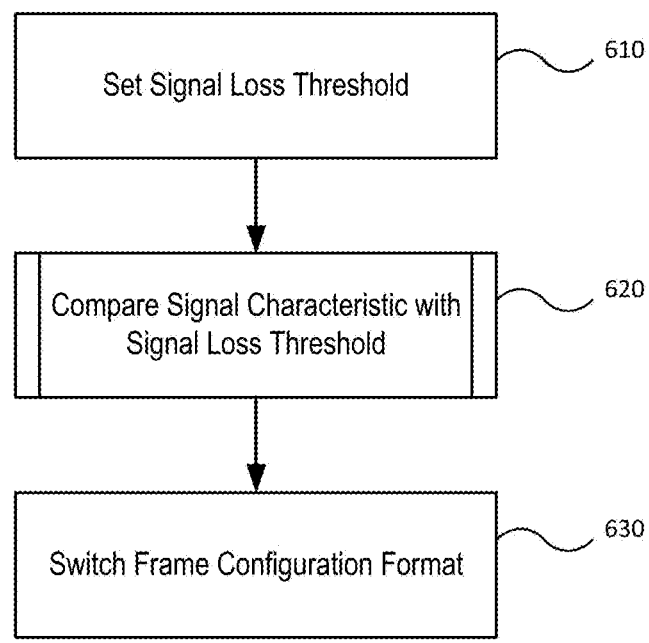
FIGS. 6, 7A, and 7B respectively illustrate exemplary process flows for managing traffic in accordance with various aspects of the present disclosure.

FIG. 6 illustrates an exemplary process flow for managing traffic (i.e., for dynamically switching frame configuration format). For purposes of explanation, it is assumed that the communicating devices (i.e., the access node and the wireless device) are capable of communicating any of a plurality of frame configuration formats. The operations of FIG. 6 will be described as being performed by the access node 300 for purposes of explanation. FIG. 6 begins at operation 610 with the access node 300 setting a signal loss threshold. Thereafter, the access node 300 compares a signal characteristic with the signal loss threshold at operation 620, the signal characteristic corresponding to a communication (e.g., a duplex communication such as a TDD communication) between the access node 300 and an associated wireless device with which the access node 300 is communicating (e.g., in a particular frame configuration format). Examples of sub-operations within operation 620 will be described in more detail below with regard to FIGS. 7A and 7B. In response to a determination that the signal characteristic exceeds the signal loss threshold, at operation 630 the access node 300 causes communications between the access node 300 and the wireless device to switch from a first frame configuration format to a second frame configuration format. The second frame configuration format may differ from the first frame configuration format in the number of subframes per frame allocated to uplink transmissions and in the number of subframes per frame allocated to downlink transmissions. Both frame configuration formats may have the same number or a different number of special subframes per frame.

Figure 7A:
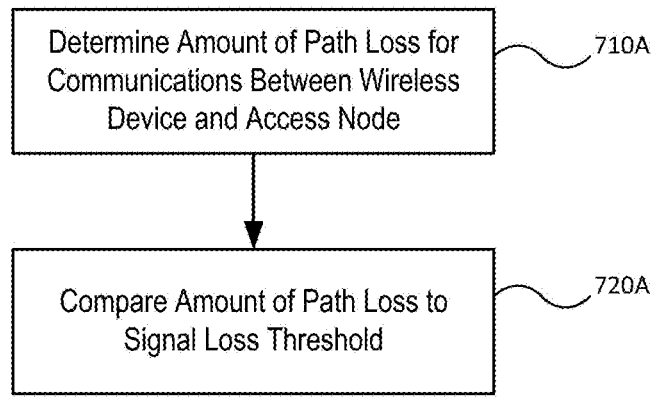
Figure 7B:
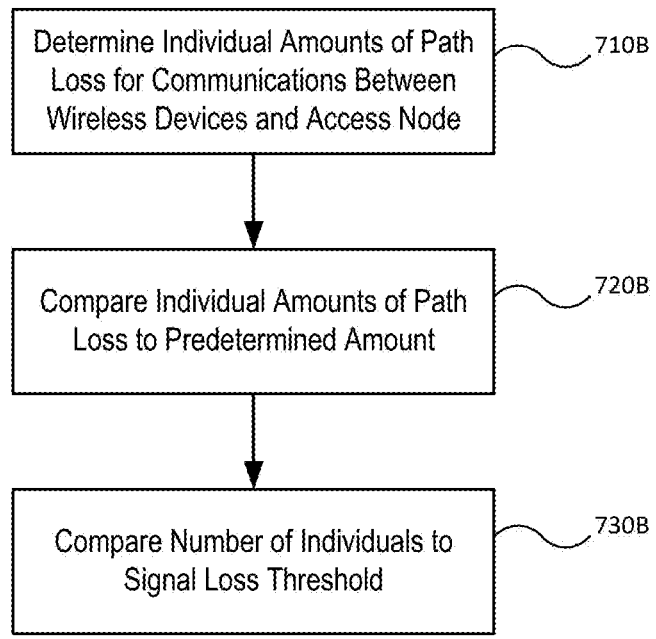

FIG. 7A illustrates an example of operation 620, in which operation 630 is performed contingent on the state of communications between the access node 300 and a connected wireless device. FIG. 7B illustrates another example of operation 620, in which operation 630 is performed contingent on the overall state of communications between the access node 300 and a plurality of connected wireless devices (e.g., all connected wireless devices).

In the case shown in FIG. 7A, operation 620 of FIG. 6 begins with operation 710A of FIG. 7A, in which the access node 300 determines an amount of path loss for communications between the access node 300 and the wireless device. The amount of path loss may be measured at the symbol level and/or as an average across multiple symbols. Then, at operation 720A, the amount of path loss is compared to a signal loss threshold (i.e., the threshold set in operation 610 of FIG. 6). Thus, in the case shown in FIG. 7A, the signal loss threshold may correspond to a threshold amount of signal loss.

In the case shown in FIG. 7B, operation 620 of FIG. 6 begins with operation 710B of FIG. 7B, in which the access node 300 determines individual amount of path loss for communications between the access node 300 and each of a plurality of wireless devices. The amount of path loss may be measured at the symbol level and/or as an average across multiple symbols. Next, at operation 720B, the access node 300 compares each of the individual amounts of path loss to a predetermined amount. Then, at operation 720C, the access node compares the number of individual amounts which exceeded the predetermined amount to the signal loss threshold (i.e., the threshold set in operation 610 of FIG. 6). Thus, in the case shown in FIG. 7B, the signal loss threshold may correspond to a threshold number of users or wireless devices. In some implementations, operation 620 of FIG. 6 may include both the operations of FIG. 7A and the operations of FIG. 7B.

The operations of FIG. 6 (which may include the operations of FIG. 7A and/or 7B) need not be performed in immediate sequence and certain operations may be repeated.

For example, operation 610 may be performed well in advance of the remaining operations (e.g., on startup of the access node 300, once per day, once per hour, etc.), and operations 620 and 630 may be performed repeatedly on demand or according to a schedule (e.g., once per hour, twice per hour, every minute, etc.). Moreover, operation 620 (and, where applicable, operation 630) may be performed once for uplink communications and once for downlink communications at each iteration. In such implementations, the access node 300 may be capable of causing the wireless device to switch to a frame configuration format having more downlink subframes per frame (e.g., FC 1 to FC 2) if downlink communication becomes degraded and of causing the wireless device to switch to a frame configuration format having more uplink subframes per frame (e.g., from FC 1 to FC 0) if uplink communication becomes degraded.

In either case, the amount of path loss may correspond to one direction of the TDD communication (i.e., to either uplink or downlink path loss). The type of frame configuration format to which the communications are switched may depend on the type of path loss which is determined. For example, if, in operation 620, the amount of path loss is determined for uplink transmissions, then the second frame configuration format of operation 630 includes more uplink subframes than does the first frame configuration format (e.g., switching from FC 2 to FC 1) Conversely, if, in operation 620, the amount of path loss is determined for downlink transmissions, then the second frame configuration format of operation 630 includes more downlink subframes than does the first frame configuration format (e.g., switching from FC 1 to FC 2). In the case where both operation 620 is repeated for both uplink and downlink communications as described above, and both uplink and downlink communications become degraded simultaneously, the access node 300 may maintain the wireless communication device within the same frame configuration format at operation 630.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing traffic in a telecommunications network, the method comprising:
   setting a signal loss threshold;
   comparing a signal characteristic with the signal loss threshold, wherein the signal characteristic corresponds to a duplex communication between a wireless communication device and an access node in a first frame configuration format, wherein the signal characteristic is a number of users experiencing at least a predetermined amount of path loss for uplink transmissions, and the signal loss threshold corresponds to a threshold number of users; and
   in response to a determination that the signal characteristic exceeds the signal loss threshold, causing the wireless communication device and the access node to switch from the first frame configuration format to a second frame configuration format,
   wherein the first frame configuration format includes a first number of subframes per frame allocated to uplink transmissions and the second frame configuration format includes a second number of subframes per frame allocated to uplink transmissions, wherein the second number is larger than the first number.

2. The method according to claim 1, wherein the signal characteristic is an amount of path loss for uplink transmissions between the access node and the wireless communication device, and the signal loss threshold corresponds to a threshold amount of signal loss.

3. The method according to claim 1, wherein the first frame configuration format includes a first subframe spacing and the second frame configuration format includes a second subframe spacing, wherein the first subframe spacing is the same as the second subframe spacing.

4. The method according to claim 1, wherein the first frame configuration format includes a first subframe duration and the second frame configuration format includes a second subframe duration, wherein the first subframe duration is the same as the second subframe duration.

5. The method according to claim 1, wherein the duplex communication is a time-division duplex (TDD) communication.

6. A telecommunications system comprising:
an access node; and
a wireless communication device configured to perform duplex communication with the access node in a plurality of frame configuration formats including a first frame configuration format and a second frame configuration format, wherein
the access node is configured to:
set a signal loss threshold,
compare a signal characteristic with the signal loss threshold, wherein the signal characteristic corresponds to the first frame configuration format, wherein the signal characteristic is a number of users experiencing at least a predetermined amount of path loss for uplink transmissions, and the signal loss threshold corresponds to a threshold number of users, and
in response to a determination that the signal characteristic exceeds the signal loss threshold, instruct the wireless communication device to switch from the first frame configuration format to a second frame configuration format, wherein the first frame configuration format includes a first number of subframes per frame allocated to uplink transmissions and the second frame configuration format includes a second number of subframes per frame allocated to uplink transmissions, wherein the second number is larger than the first number.

7. The system according to claim 6, wherein the signal characteristic is an amount of path loss for uplink transmissions between the access node and the wireless communication device, and the signal loss threshold corresponds to a threshold amount of signal loss.

8. The system according to claim 6, wherein a numerology of the first frame configuration format is the same as a numerology of the second frame configuration format.

9. The system according to claim 6, wherein the duplex communication is a full duplex communication using a time-division duplex (TDD) arrangement.

10. A processing node for managing traffic in a telecommunications network, the processing node comprising:
a memory; and
a processor configured to perform operations comprising:
setting a signal loss threshold,
comparing a signal characteristic with the signal loss threshold, wherein the signal characteristic corresponds to a duplex communication between a wireless communication device and an access node in a first frame configuration format, wherein the signal characteristic is a number of users experiencing at least a predetermined amount of path loss for uplink transmissions, and the signal loss threshold corresponds to a threshold number of users, and
in response to a determination that the signal characteristic exceeds the signal loss threshold, causing the wireless communication device and the access node to switch from the first frame configuration format to a second frame configuration format, wherein the first frame configuration format includes a first number of subframes per frame allocated to uplink transmissions and the second frame configuration format includes a second number of subframes per frame allocated to uplink transmissions, wherein the second number is larger than the first number.

11. The processing node according to claim 10, wherein the signal characteristic is an amount of path loss for uplink transmissions between the access node and the wireless communication device, and the signal loss threshold corresponds to a threshold amount of signal loss.

12. The processing node according to claim 10, wherein a frame of the first frame configuration format and a frame the second frame configuration format respectively include downlink subframes, uplink subframes, and special subframes, and wherein the second frame configuration format includes more uplink subframes per frame than the first frame configuration format.

13. The processing node according to claim 12, wherein the second frame configuration format includes the same number of special subframes per frame as the first frame configuration format.

14. The processing node according to claim 10, wherein the processing node is located in the access node.

* * * * *